(12) United States Patent
Schindler et al.

(10) Patent No.: US 12,129,950 B2
(45) Date of Patent: Oct. 29, 2024

(54) DEVICE FOR CONNECTING TWO TUBULAR OBJECTS

(71) Applicant: NORMA Germany GmbH, Maintal (DE)

(72) Inventors: René Schindler, Maintal (DE); Daniel Kintea, Maintal (DE); David Schneider, Maintal (DE)

(73) Assignee: Norma Germany GmbH, Maintal (DE)

( * ) Notice: Subject to any disclaimer, the term of this patent is extended or adjusted under 35 U.S.C. 154(b) by 3 days.

(21) Appl. No.: 18/008,319

(22) PCT Filed: May 26, 2021

(86) PCT No.: PCT/EP2021/064112
§ 371 (c)(1),
(2) Date: Dec. 5, 2022

(87) PCT Pub. No.: WO2021/244925
PCT Pub. Date: Dec. 9, 2021

(65) Prior Publication Data
US 2023/0204140 A1     Jun. 29, 2023

(30) Foreign Application Priority Data
Jun. 5, 2020 (DE) ..................... 10 2020 115 021.2

(51) Int. Cl.
*F16L 37/098* (2006.01)
(52) U.S. Cl.
CPC ............................... *F16L 37/0985* (2013.01)
(58) Field of Classification Search
CPC ...... F16L 37/0985; F16L 37/10; F16L 37/103
See application file for complete search history.

(56) References Cited

U.S. PATENT DOCUMENTS

| | | |
|---|---|---|
| 6,199,920 B1 | 3/2001 | Neustadtl |
| 2007/0120362 A1 | 5/2007 | Poder |

(Continued)

FOREIGN PATENT DOCUMENTS

| | | |
|---|---|---|
| DE | 102011084988 A1 | 4/2013 |
| WO | WO2005047753 A1 | 5/2005 |

OTHER PUBLICATIONS

Japanese Office Action for Japanese Application No. 2022-573556 dated Dec. 19, 2023 (6 pages).

(Continued)

*Primary Examiner* — David Bochna
(74) *Attorney, Agent, or Firm* — REISING ETHINGTON, P.C.

(57) ABSTRACT

A device for connecting two tubular objects has a connection piece housing and a securing element. The securing element is shaped in a complementary manner with respect to a receiving opening of the connection piece housing and is arranged rotatably in the receiving opening and has an insertion opening for receiving a connection piece. The securing element has securing tabs which are spaced apart from one another in the circumferential direction and each have a radially inwardly facing securing body for engaging in shaped features of a connection piece and can be moved from a first position into a second radial position lying radially on the outside. The connection piece housing has, for each securing tab, a ramp surface which is bevelled radially inwards and on which the securing tab rests.

13 Claims, 4 Drawing Sheets

(56) References Cited

U.S. PATENT DOCUMENTS

| | | |
|---|---|---|
| 2008/0129047 A1 | 6/2008 | Blivet et al. |
| 2018/0051838 A1* | 2/2018 | Hamon .............. F16L 37/0985 |
| 2019/0390808 A1 | 12/2019 | Trotter et al. |

OTHER PUBLICATIONS

English Translation of Japanese Office Action for Japanese Application No. 2022-573556 dated Dec. 19, 2023 (7 pages).
German Office Action for German Application No. 10 2020 115 021.0 dated Feb. 25, 2021 (5 pages).
International Search Report for International Application No. PCT/EP2021/064112 dated Aug. 13, 2021 (3 pages).
English Translation of International Search Report for International Application No. PCT/EP2021/064112 dated Aug. 13, 2021 (2 pages).
Canadian Office Action for Canadian Application No. 3,172,562 dated Oct. 27, 2023 (4 pages).
International Preliminary Report on Patentability for International Application No. PCT/EP2021/064112 dated Dec. 6, 2022 (7 pages).
English Translation of International Preliminary Report on Patentability for International Application No. PCT/EP2021/064112 dated Dec. 6, 2022 (8 pages).
Japanese Office Action for Japanese Application No. 2022-573556 dated Jun. 25, 2024 (4 pages).
English Translation of Japanese Office Action for Japanese Application No. 2022-573556 dated Jun. 25, 2024 (6 pages).
European Office Action for European Application No. 21730132.4 dated Feb. 8, 2024 (5 pages).

\* cited by examiner

DEVICE FOR CONNECTING TWO TUBULAR OBJECTS

INTRODUCTION

The disclosure relates to a device for connecting two tubular objects.

Such devices are typically able to connect together tubular objects which have a predominantly rigid shape and are constructed from a solid material. To this end, it is known to use a connection piece housing with a connection piece which is arranged thereon and which may be plugged into one of the tubular objects. The other tubular object may be configured in the form of a connection piece or provided therewith. Said connection piece is then inserted into an insertion end of such a device and locked therein.

In some known devices it may be necessary to undertake manual locking and to monitor visually the locking which has been carried out. However, this may be complex or difficult in locations which are difficult to access in elaborate technical systems. Additionally, by the use of three or more components, known devices are complex and thus cost-intensive in the manufacture thereof.

WO 2005/047753 A1 discloses a coupling device for connecting two stiff, tubular objects, wherein the device has a socket part, a plug part and a sleeve-shaped element which may be attached therebetween. Resilient tongues are provided for snapping the components together.

SUMMARY

It is one object of the disclosure to propose a device for connecting two tubular objects, in which a locking may be ensured in a reliable manner and without excessive effort, and a manufacture which is as cost-effective as possible is enabled.

A device for connecting two tubular objects is proposed, the device having a connection piece housing and a securing element, wherein the connection piece housing has a sleeve portion with a receiving opening, wherein the securing element is shaped in a complementary manner with respect to the receiving opening and is arranged rotatably in the receiving opening, and has an insertion opening for receiving a connection piece, wherein the securing element has securing tabs spaced apart from one another in the circumferential direction, and each have a radially inwardly facing securing body for engaging in shaped features of an inserted connection piece and can be moved from a first radial position into a second radial position lying radially on the outside. According to an embodiment, it is provided that the connection piece housing has, for each securing tab, a ramp surface which is beveled radially inwards and on which the respective securing tab rests with a supporting surface, wherein the ramp surface and the supporting surface are shaped such that, by rotation of the securing element about a central axis of the connection piece housing in a first direction, the securing tabs are pushed into the second radial position and, in an unloaded state, the securing element is rotated back into a second direction opposed to the first direction by the securing tabs springing back into the first position.

As a result, the device is configured to connect together two tubular objects, one thereof being couplable to the connection piece housing and the other having a connecting element, for example a connection piece, for inserting into the insertion opening of the securing element. However, other devices which may be configured on the connection piece housing are also conceivable. The configuration is not essential for the function of the device and is not intended to be interpreted hereinafter as a limitation.

The securing element is provided to secure the connecting element in the inserted state such that it is not able to slip out of the securing element automatically by vibration, inertia forces or by a fluid flowing therein, or the like. To this end, the connecting element could have one or more circumferential grooves on an outer lateral surface and into which the securing bodies of the securing tabs may penetrate in the radial direction. The connecting element is then secured in the axial direction.

The securing element and the sleeve-shaped portion are configured in a complementary manner to one another, such that the securing element is preferably latched or secured in a different manner in the receiving opening. To this end, radial recesses could be provided in the connection piece housing, parts of the securing tabs or elements connected thereto being able to protrude therein. This is explained in more detail further below.

The securing element could have an approximately annular or sleeve-shaped base which has the insertion opening. The securing tabs may extend in the axial direction on a side of the securing element remote from the insertion opening. The base of the securing element may be rotatably coupled to the connection piece housing such that the securing tabs may be moved in the circumferential direction of the connection piece housing by rotating the securing element. It may be advantageous per an embodiment to distribute two, three, four or more securing tabs over the circumference.

In one of the regions overlapping the securing tabs, the connection piece housing in each case has a ramp surface, an associated supporting surface of the securing tabs resting thereon. In this case, the ramp surface is respectively beveled radially inwards such that, by rotating the securing element, the supporting surface slides on the ramp surface. Due to the radially inwardly oriented bevel of the ramp surface, a radially outwardly oriented movement of the securing tabs takes place by the rotation in the first direction and the resulting sliding. By releasing the securing element, the supporting surfaces press against the associated ramp surface and thereby rotate the securing element back in the opposing second direction. The securing tabs at the same time reach the first position again. The supporting surface and the sliding surface are configured such that they permit an unhindered rotation back.

Accordingly, one advantage of the device according to an embodiment is that a simple assembly and a simple dismantling of a connection piece in the insertion opening is made possible. A user merely has to rotate the securing element in the first direction, such that the securing tabs are forced radially outwardly and thereby the connection piece or a different connection element is released or may be inserted. Since the securing element is subsequently rotated back and the securing tabs are forced back into the first radial position, the user does not have to perform any further working steps after the insertion of the connection piece. As a result, the device according to an embodiment may be arranged on a connecting element of a subassembly in such a manner that it may be subsequently attached to a further tubular object in a final assembly. By the design of the device it is possible to ensure that the device is not released from the connection piece. The relevant subassembly may thus be assembled in a simplified manner. The automatic locking leads to the device always being in a closed state, i.e. connected or not connected. It is thus not possible for the device to remain in an open state.

In an embodiment, the securing tabs are configured to be radially resilient. The radial resilience may be ensured, for example, by selecting a plastics material which is suitable therefor. The securing tabs have a basic shape which the securing element adopts in an unloaded state. If the securing tabs are subjected to an outwardly acting radial force when sliding on the ramp surface, they may follow this force by performing a radial deflecting movement. In this case, it is expedient to configure a region specifically therefor. As described further below, this region may be arranged in each case on a free end of the securing tabs.

It may also be advantageous per an embodiment if the ramp surface has a radially external first portion and a radially internal second portion, wherein the first portion runs in a linear manner and the second portion is beveled radially inwards to a greater extent than the first portion. The first portion thus has a planar surface which is continuously linear. As a result, the first portion forms a linear section in a plane which runs perpendicular to the central axis of the connection piece housing. To this end, the second portion runs at an angle and is beveled inwardly to a greater extent. This means that the second portion moves radially inwardly in the running direction of the ramp surface to a greater extent than the first portion. When rotating the securing element, the supporting surface initially comes into contact with the second portion and then slides onto the first portion. The second portion leads to a greater initial bending of the securing tabs, wherein the increase in the bending subsequently, i.e. when reaching the first portion, becomes slightly weaker.

The first portion could define a directional axis which runs past the central axis, in a plane located perpendicular to the central axis. As a result, the first portion could define on the connection piece housing a circular segment which has a center angle of significantly below 180°. The angle of the first portion relative to a tangent, which is formed on the radially external end of the ramp surface and which is located on a circumferential surface of the connection piece housing, could be significantly below 45°, for example.

It may be preferred per certain embodiments if the securing element has a radial recess for each securing tab, wherein the ramp surface is arranged in the recess and terminates at an end of the recess on the circumferential side. Such a recess is suitable for receiving a securing tab. The securing tab might then be at least partially able to be forced radially outwardly, wherein it then obtains a sufficient freedom of movement due to the recess. The recess may be additionally configured such that the device may be assembled by pushing together the securing element and the connection piece housing and the securing tab is held on the connection piece housing by shaped features suitable therefor.

It may be particularly preferred per certain embodiments if the ramp surface at the end on the circumferential side has a first angle relative to a first radius line, which is located on a plane perpendicular to the central axis and which extends centrally through the recess, wherein the first angle ranges from 72° to 74°. The first radius line could form a line of symmetry or a center line and extend centrally through the recess in the plane located perpendicular to the central axis. The ramp surface is arranged at an end of the recess on the circumferential side, and the securing tab with the supporting surface has to move toward this end on the circumferential side, so that the supporting surface is forced radially outwardly by the ramp surface. Amongst other things, the size of the first angle is selected for the movement of the supporting surface radially outwardly. So that a tilting or jamming is prevented, the angle is selected from the aforementioned range.

In an embodiment, a rounded transition portion may be arranged between the first portion and the second portion, said rounded transition portion adjoining the first portion and the second portion in a tangentially constant manner. The rounded transition portion may perform a transfer of the supporting surface from the second to the first portion. The sliding of the supporting surface on the ramp surface is improved by a rounded design.

As set forth above, the securing tabs may have a free end which is remote from the insertion opening and on which the respective supporting surface is arranged. Thus the resilience of the securing element is permitted and the radial movement of the supporting surface promoted or provided.

The supporting surface may also have a lead-in portion and a transition portion, wherein the lead-in portion is beveled radially inwards and the transition portion is beveled radially outwards. The transition portion may provide a smooth transition to the lead-in portion. The lead-in portion comes into flat contact with the ramp surface and ensures the radial deflection.

In an embodiment, the lead-in portion and the transition portion enclose a curved portion which adjoins the lead-in portion and the return portion in a tangentially constant manner. The arrangement of the curved portion in a tangentially constant manner prevents the jamming of the securing tab and does not counteract a simpler sliding movement.

In an embodiment, the lead-in portion is arranged on a defining edge of the relevant securing tab on the circumferential side and forms a second angle relative to a second radius line which is located on a plane perpendicular to the central axis and which extends centrally through the securing tab, wherein the second angle ranges from 55° to 65°. The second angle promotes the rotation back into the first position.

The transition portion could additionally enclose a third angle with the second radius line which ranges from 73° to 80°.

Furthermore, the securing tabs in the second position could protrude radially outwardly beyond the recess and function as a display element for displaying an open device. In this case, a user may immediately identify that the device is not completely closed if a part of the securing tab protrudes through the recess. This could mean, for example, that the connection piece is not fully inserted, the securing bodies not completely engaging therein in the radial direction.

Finally, in an embodiment the securing element may have at least one grip element for initiating a rotation. Thus the initiation of the rotation for a user is significantly simplified by the connection piece housing being gripped with one hand and the grip element with the other hand and thus the rotation is made possible.

BRIEF DESCRIPTION OF THE FIGURES

Further features, details and advantages of the invention emerge from the wording of the claims and from the following description of exemplary embodiments by way of the drawings. In the drawings:

DETAILED DESCRIPTION

Figure 1:
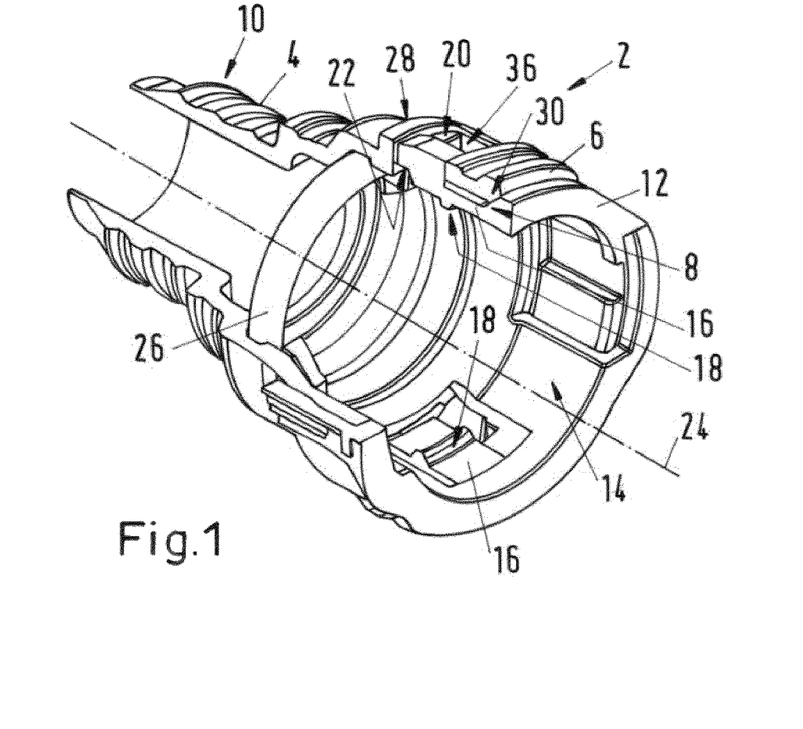
FIG. 1 shows a three-dimensional, partially sectional view of the device.

FIG. 1 shows a device 2 for connecting two tubular objects in a partially sectional, three-dimensional view. The device 2 has a connection piece housing 4 and a securing element 12 which is inserted into the connection piece housing 4. The connection piece housing 4 has a sleeve portion 6 with a receiving opening 8, the securing element 12 being inserted therein. For connecting to a first tubular body, the connection piece housing 4 has a connection piece portion 10 which by way of example is provided with a groove-shaped profile, which may be wedged with the first tubular body.

The securing element 12 is rotatably arranged in the receiving opening 8 and has an access opening 14 for receiving a connection piece. This is shown, for example, in FIG. 4. Moreover, the securing element 12 has securing tabs 16 which are spaced apart from one another in the circumferential direction and which in each case have a radially inwardly facing securing body 18. These securing bodies serve to engage in a complementary shaped groove of a connection piece arranged in the insertion opening 14. The securing tabs 16 are also resiliently deformable and may be moved from a first radial position (shown here) into a radially external second radial position. A connection piece, which is inserted into the insertion opening 14, could accordingly be latched to the securing bodies 18. The securing tabs 16 also have in each case a fixed end 30 and a free end 28. The securing tabs are resilient as a whole, such that the free end 28 may be radially moved.

The connection piece housing 4 has a radially inwardly beveled ramp surface 20 for each securing tab 16. The respective securing tab 16 is located with a radially internal supporting surface 22 on the relevant ramp surface 20. In this case, the ramp surface 20 and the supporting surface 22 are shaped such that by rotating the securing element 12 about a central axis 24 of the connection piece housing 4 in a first direction the securing tabs 16 are forced into the second radial position. In this case, in the exemplary embodiment shown, the first direction corresponds to a rotation in the clockwise direction. The securing element 12 in an unloaded state, i.e. when the securing tab 16 is released and springs back into the first position, in the meantime is rotated back into a second direction opposing the first direction. As a result, the second direction corresponds to a rotation counter to the clockwise direction. By a rotation of the securing element 12 in one direction, the device 2 is configured to release a connection piece which is located in the insertion opening 14 and without further action automatically return again into the locked state with the securing tabs 16 pivoted back radially inwardly. As a result, the device 2 is self-locking.

The device 2 also has a sealing element in the form of a sealing ring 26 which is arranged in the connection piece housing 4 and which is configured to come into contact flush with a front face of a connection piece inserted into the insertion opening 14. As a result, the fluid connection between the connection piece and the connection piece portion 10 is sealed.

Figure 2:
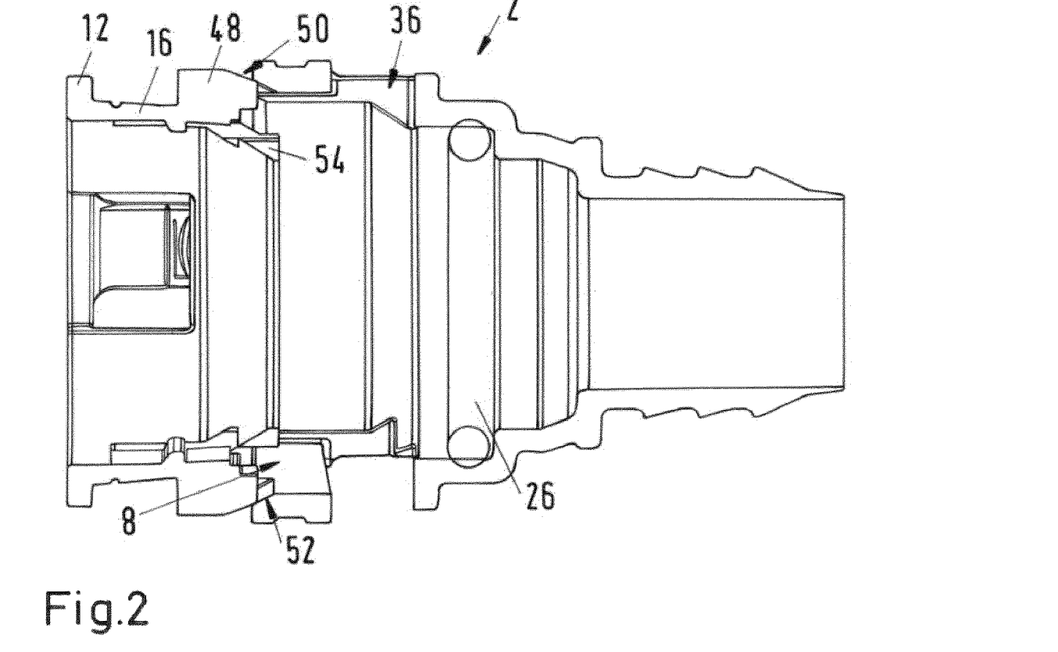
FIG. 2 shows a longitudinal section of the device.

In FIG. 2 the device 2 is shown from a different perspective. Here the securing element 12 is not yet fully inserted into the receiving opening 8. The projections 48 of the securing tab 16 are visible, said projections in each case having a radially inwardly beveled lead-in surface 50, shaped in a complementary manner to a radially outwardly beveled guide surface 52 on the receiving opening 8. By plugging on the securing element 12, the securing tabs 16 are forced radially inwardly, such that when the securing element 12 is fully inserted the projection 48 enters a recess 36 of the connection piece housing 4 on the circumferential side. Thus the securing element 12 is assembled and is able to fulfill the above-described function. The securing element 12 may have a type of stop ring 54 radially inside the projections 48, said stop ring defining a radially inwardly oriented movement of the projections 48.

Figure 3:
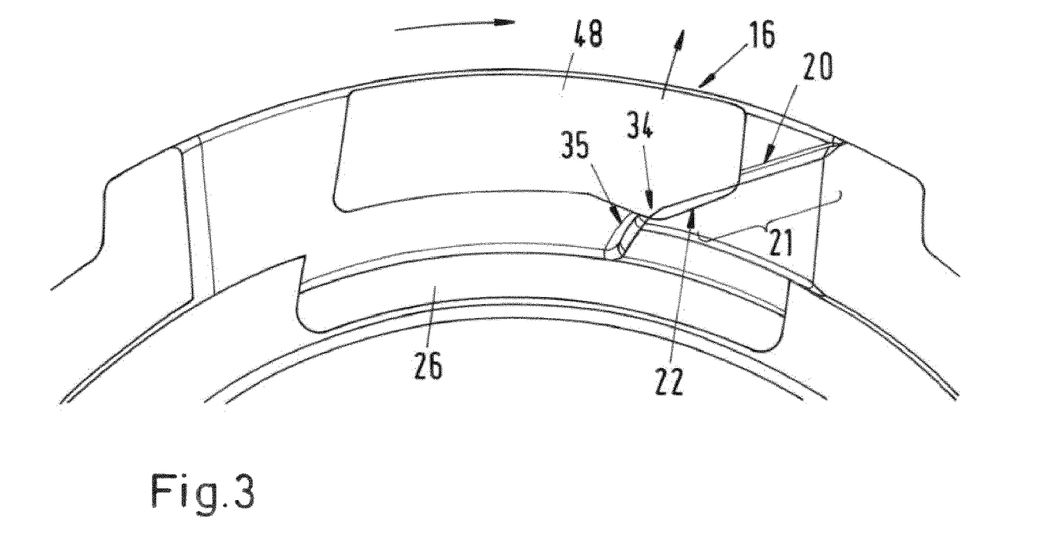
FIG. 3 shows a detailed view of the device.

FIG. 3 shows a detailed view of a projection 48 of a securing tab 16, wherein the supporting surface 22 rests on the ramp surface 20 of the connection piece housing 4. Here it is visible that the supporting surface 22 and the ramp surface 20 are shaped so as to correspond to one another. When rotating the securing element 12 in the clockwise direction, the securing tab 16 migrates radially outwardly.

Figure 4:
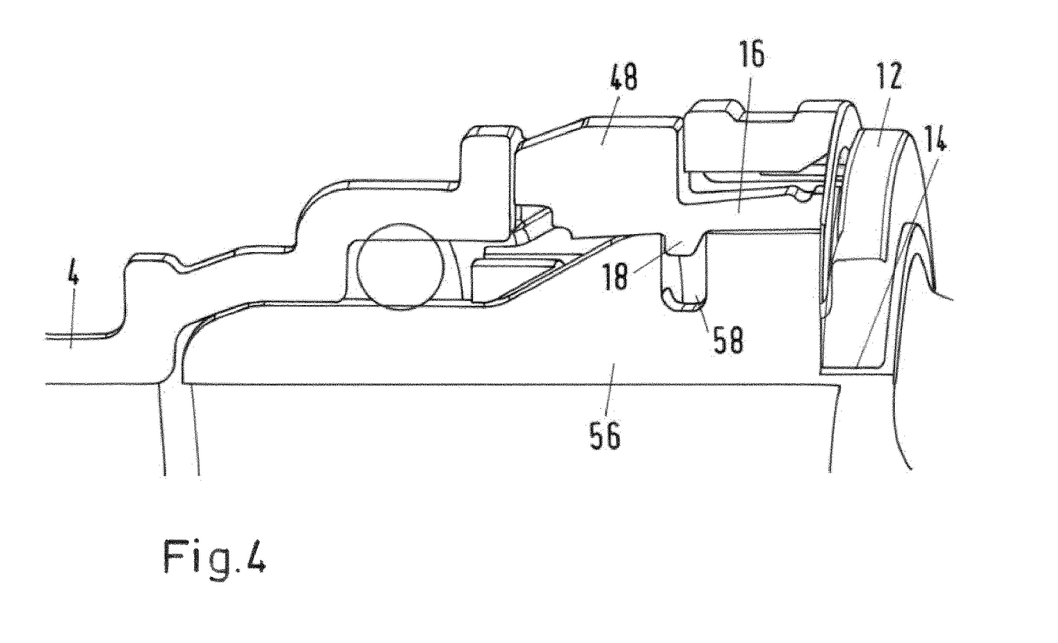
FIG. 4 shows a detail of a longitudinal section of the device.

FIG. 4 shows the securing element 12 in the inserted state in the connection piece housing 4. An inserted connection piece 56 which has a circumferential groove 58 as a shaped feature is located in the insertion opening 14. This circumferential groove is configured such that the securing bodies 18 of the securing tab 16 engage in the groove 58. In this view, the securing tab 16 is shown in the first position, i.e. radially internally. By rotating the securing element 12, the projection 48 is moved radially outwardly such that the securing body 18 leaves the groove 58. This unlocked state is maintained only as long as a user rotates the securing element 12 in the first direction or holds said securing element in the rotated position. As soon as the securing element 12 is released, the securing tabs 16 spring back into the state shown in FIG. 4.

Figure 5:
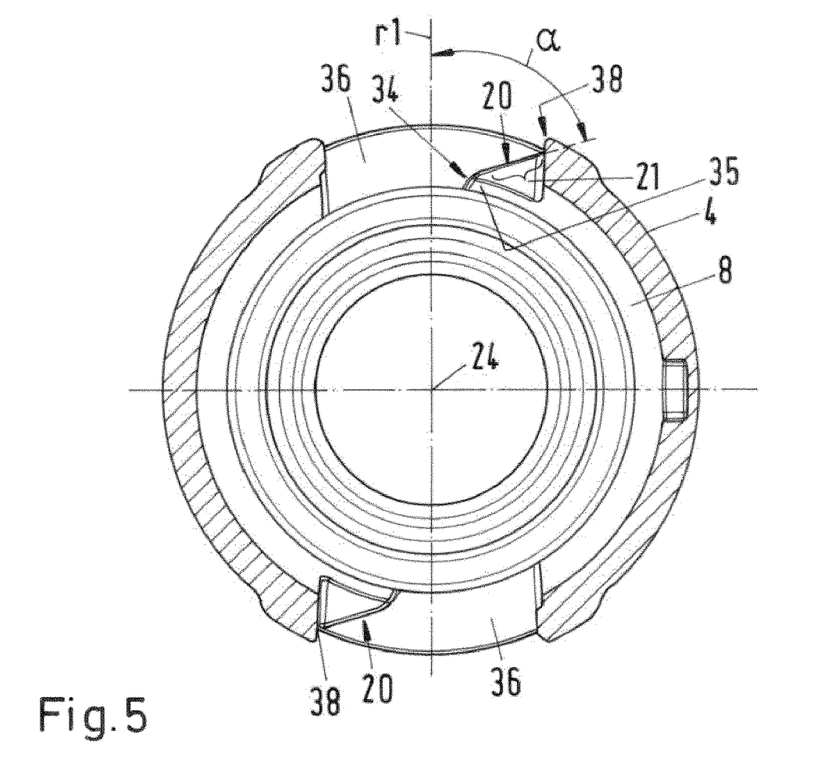
FIG. 5 shows a sectional view with a cutting plane transversely to the central axis.

In FIG. 5 a sectional view of the connection piece housing 4 is shown in a cutting plane perpendicular to the central axis 24, wherein the cutting plane runs adjacent to the ramp surface 20. Shown here is a first angle α which is enclosed between the ramp surface 20 and a first radius line r1, which is located on a plane perpendicular to the central axis 24 and at the same time extends centrally through the recess 36. The first angle α preferably ranges from 72° to 74°. The first radius line r1 is a line of symmetry or a center line. The supporting surface 22 is designed in a similar manner to that visible in FIG. 3.

The ramp surface 20 in this case is arranged at an end 38 of the recess 36 on the circumferential side and, when the supporting surface 22 bears against the ramp surface 20, this supporting surface has to move in the direction of the end 38 on the circumferential side. The projection 48 is then forced radially outwardly by the surfaces 20 and 22 sliding on one another. The securing body 18 follows this movement and leaves the groove 58 of an inserted connection piece 56.

Figure 6:
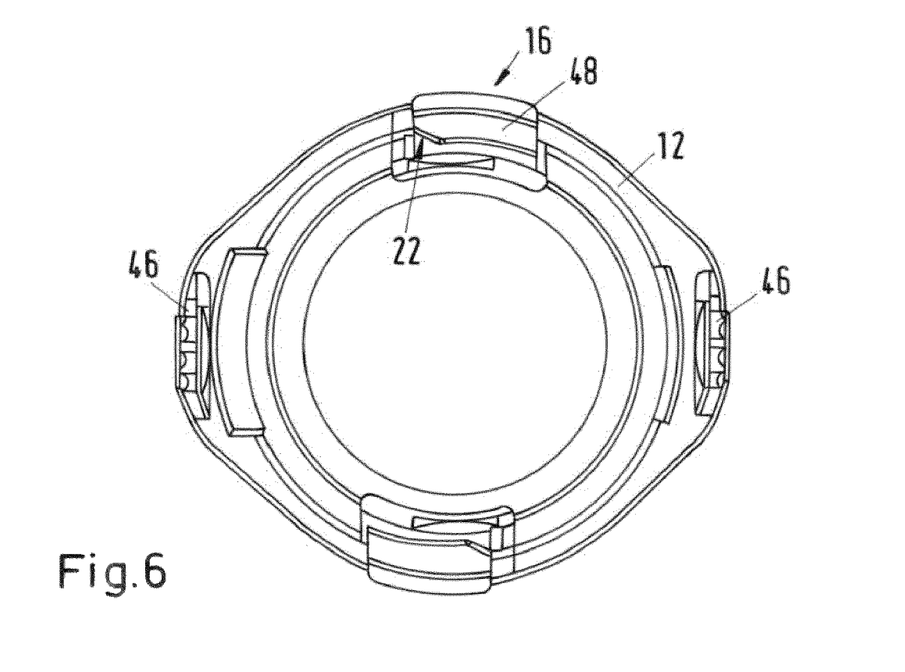
FIG. 6 shows a plan view of the securing element.

FIG. 6 shows a plan view of a front face of the securing element 12 facing the connection piece housing 4. Here the securing tab 16 or the projections 48 arranged thereon are visible. In the exemplary embodiment shown, two securing tabs 16 are arranged offset by 180° on the circumferential side. Two opposing grip elements 46 are arranged spaced apart therefrom in each case by 90° in the circumferential direction, a user being able to rotate the securing element 12 thereby.

Figure 7:
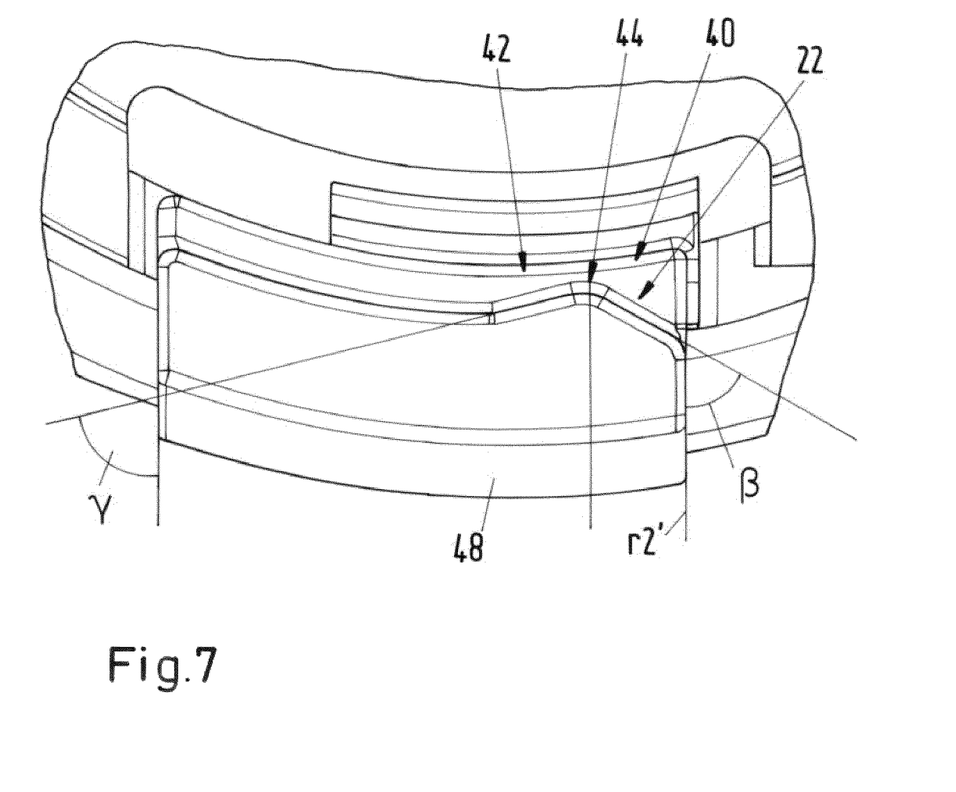
FIG. 7 shows a detailed view.

Finally FIG. 7 shows an enlarged view of a projection 48 with the supporting surface 22. A lead-in portion 40 is formed thereby, followed by a curved portion 44 and a transition portion 42. Whilst the second angle β is selected to be similar to the first angle α, the transition portion 42 may be selected relatively randomly. This transition portion has in this case a third angle γ which encloses with the second radius line r2 an angle ranging from 73° to 80°.

The invention is not limited to the above-described embodiments but may be modified in many different ways.

All of the features and advantages, including structural details, spatial arrangements and method steps, emerging from the claims, the description and the drawing, may be essential to the invention both per se and also in very different combinations.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

2 Device
4 Connection piece housing
6 Sleeve portion
8 Receiving opening
10 Connection piece portion
12 Securing element
14 Insertion opening
16 Securing tab
18 Securing body
20 Ramp surface
21 First portion
22 Supporting surface
24 Central axis
26 Sealing ring
28 Free end
30 Fixed end
32 Base
34 Transition portion
35 Second portion
36 Recess
38 End on circumferential side
40 Lead-in portion
42 Transition portion
44 Curved portion
46 Grip element
48 Projection
50 Lead-in surface
52 Guide surface
54 Stop ring
56 Connection piece
58 Groove
α First angle
β Second angle
γ Third angle
r1 First radius line
r2 Second radius line
r2' Parallel line to second radius line

The invention claimed is:

1. A device for connecting two tubular objects, the device comprising a connection piece housing and a securing element, wherein the connection piece housing has a sleeve portion with a receiving opening, wherein the securing element is shaped in a complementary manner with respect to the receiving opening and is arranged rotatably in the receiving opening, and has an insertion opening for receiving a connection piece, wherein the securing element has securing tabs spaced apart from one another in the circumferential direction, and each have a radially inwardly facing securing body for engaging in shaped features of an inserted connection piece and can be moved from a first radial position into a second radial position lying radially on the outside, wherein the connection piece housing has, for each securing tab, a ramp surface which is beveled radially inwards and on which the respective securing tab rests with a supporting surface, wherein the ramp surface and the supporting surface are shaped such that, by rotation of the securing element about a central axis of the connection piece housing in a first direction, the securing tabs are pushed into the second radial position and, in an unloaded state, the securing element is rotated back into a second direction opposed to the first direction by the securing tabs springing back into the first position, wherein the supporting surface has a lead-in portion and a transition portion, wherein the lead-in portion is beveled radially inwards and the transition portion is beveled radially outwards, wherein the lead-in portion is arranged on a defining edge of the relevant securing tab on the circumferential side and forms a second angle (β) relative to a second radius line (r2) which is located on a plane perpendicular to the central axis and which extends centrally through the securing tab, wherein the second angle (β) ranges from 55° to 65°.

2. The device as claimed in claim 1, wherein the securing tabs are configured to be radially resilient.

3. The device as claimed in claim 1, wherein the ramp surface has a radially external first portion and a radially internal second portion, wherein the first portion runs in a linear manner and the second portion is beveled radially inwards to a greater extent than the first portion.

4. The device as claimed in claim 3, wherein a rounded transition portion is arranged between the first portion and the second portion, said rounded transition portion adjoining the first portion and the second portion in a tangentially constant manner.

5. The device as claimed in claim 1, wherein the securing element has a radial recess for each securing tab, wherein the ramp surface is arranged in the recess and terminates at an end of the recess on the circumferential side.

6. The device as claimed in claim 5, wherein the ramp surface at the end on the circumferential side forms a first angle (α) relative to a first radius line (r1), which is located on a plane perpendicular to the central axis and which extends centrally through the recess, wherein the first angle (α) ranges from 72° to 74°.

7. The device as claimed in claim 5, wherein the securing tabs in the second position protrude radially outwardly beyond the recess and function as a display element for displaying an open device.

8. The device as claimed in claim 1, wherein the securing tabs have a free end which is remote from the insertion opening and on which the respective supporting surface is arranged.

9. The device as claimed in claim 1, wherein the lead-in portion and the transition portion enclose a curved portion which adjoins the lead-in portion and the transition portion in a tangentially constant manner.

10. The device as claimed in claim 1, wherein the securing element has at least one grip element for initiating a rotation.

11. A device for connecting two tubular objects, the device comprising a connection piece housing and a securing element, wherein the connection piece housing has a sleeve portion with a receiving opening, wherein the securing element is shaped in a complementary manner with respect to the receiving opening and is arranged rotatably in the receiving opening, and has an insertion opening for receiving a connection piece, wherein the securing element has securing tabs spaced apart from one another in the circumferential direction, and each have a radially inwardly facing securing body for engaging in shaped features of an inserted connection piece and can be moved from a first radial position into a second radial position lying radially on the outside, wherein the connection piece housing has, for each securing tab, a ramp surface which is beveled radially inwards and on which the respective securing tab rests with a supporting surface, wherein the ramp surface and the supporting surface are shaped such that, by rotation of the securing element about a central axis of the connection piece housing in a first direction, the securing tabs are pushed into the second radial position and, in an unloaded state, the securing element is rotated back into a second direction opposed to the first direction by the securing tabs springing back into the first position, wherein the supporting surface has a lead-in portion and a transition portion, wherein the lead-in portion is beveled radially inwards and the transition portion is beveled radially outwards.

12. A device for connecting two tubular objects, the device comprising a connection piece housing and a securing element, wherein the connection piece housing has a sleeve portion with a receiving opening, wherein the securing element is shaped in a complementary manner with respect to the receiving opening and is arranged rotatably in the receiving opening, and has an insertion opening for receiving a connection piece, wherein the securing element has securing tabs spaced apart from one another in the circumferential direction, and each have a radially inwardly facing securing body for engaging in shaped features of an inserted connection piece and can be moved from a first radial position into a second radial position lying radially on the outside, wherein the connection piece housing has, for each securing tab, a ramp surface which is beveled radially inwards and on which the respective securing tab rests with a supporting surface, wherein the ramp surface and the supporting surface are shaped such that, by rotation of the securing element about a central axis of the connection piece housing in a first direction, the securing tabs are pushed into the second radial position and, in an unloaded state, the securing element is rotated back into a second direction opposed to the first direction by the securing tabs springing back into the first position, wherein the supporting surface has a lead-in portion and a transition portion, wherein the lead-in portion is beveled radially inwards and the transition portion is beveled radially outwards, wherein the lead-in portion and the transition portion enclose a curved portion which adjoins the lead-in portion and the transition portion in a tangentially constant manner.

13. The device as claimed in claim 12, wherein the lead-in portion is arranged on a defining edge of the relevant securing tab on the circumferential side and forms a second angle (β) relative to a second radius line (r2) which is located on a plane perpendicular to the central axis and which extends centrally through the securing tab, wherein the second angle (β) ranges from 55° to 65°.

* * * * *